(12) United States Patent
Tacke et al.

(10) Patent No.: US 8,371,529 B2
(45) Date of Patent: Feb. 12, 2013

(54) INTERCONNECTION AND AIRCRAFT OR SPACECRAFT HAVING SUCH AN INTERCONNECTION

(75) Inventors: Stefan Tacke, Buxtehude (DE); Andre Stuebs, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 227 days.

(21) Appl. No.: 12/868,101

(22) Filed: Aug. 25, 2010

(65) Prior Publication Data

US 2011/0042519 A1 Feb. 24, 2011

Related U.S. Application Data

(63) Continuation of application No. PCT/EP2009/051193, filed on Feb. 3, 2009.

(60) Provisional application No. 61/067,922, filed on Mar. 3, 2008.

(30) Foreign Application Priority Data

Mar. 3, 2008 (DE) .......................... 10 2008 012 252

(51) Int. Cl.
*B64C 1/06* (2006.01)
(52) U.S. Cl. ...................................................... 244/119
(58) Field of Classification Search ............. 244/123.14, 244/119, 123.1, 131, 117 R, 132, 124, 123.8
See application file for complete search history.

(56) References Cited

U.S. PATENT DOCUMENTS

| | | | | |
|---|---|---|---|---|
| 2,386,522 A | * | 10/1945 | Watter | ........................ 244/123.1 |
| 4,828,202 A | * | 5/1989 | Jacobs et al. | ............... 244/117 R |
| 5,242,523 A | * | 9/1993 | Willden et al. | ................ 156/285 |
| 5,893,534 A | * | 4/1999 | Watanabe | ...................... 244/119 |
| 6,105,902 A | | 8/2000 | Pettit | |
| 7,871,040 B2 | * | 1/2011 | Lee et al. | ........................ 244/119 |
| 2006/0060705 A1 | | 3/2006 | Stulc et al. | |
| 2006/0226287 A1 | * | 10/2006 | Grantham et al. | ............. 244/119 |
| 2009/0283638 A1 | * | 11/2009 | Arevalo Rodriguez et al. | ............... 244/119 |
| 2010/0237195 A1 | * | 9/2010 | Stephan | ......................... 244/132 |
| 2011/0095130 A1 | * | 4/2011 | Luettig | ......................... 244/119 |

FOREIGN PATENT DOCUMENTS

| | | |
|---|---|---|
| DE | 102008006834 | 10/2009 |
| FR | 2922516 A | 4/2009 |
| WO | WO 98/58759 | 12/1998 |

OTHER PUBLICATIONS

German Office Action for DE 10 2008 012 252.1 dated May 11, 2010.
International Search Report for PCT/EP2009/051193 dated Jul. 23, 2009 (mail date Jul. 28, 2009).

* cited by examiner

*Primary Examiner* — Tien Dinh
(74) *Attorney, Agent, or Firm* — Jenkins, Wilson Taylor & Hunt, P.A.

(57) ABSTRACT

The invention relates to an interconnection, including: a T-stringer which has a web portion and two foot portions; a Ω-stringer which has a comb portion and two foot portions; and a connection arrangement which joins together the foot portions of the T-stringer and of the Ω-stringer, wherein the connection arrangement joins together the T-stringer and the Ω-stringer, wherein the connection arrangement has a first and a second connection element, the connection elements connecting a first foot portion of the T-stringer to a first foot portion of the Ω-stringer, respectively, wherein the connection elements together have a substantially H-shaped outline, and wherein at least one angle bracket, in particular for connecting a former to the Ω-stringer and the T-stringer, is connected to the widening foot portions of the first and second connection elements.

7 Claims, 6 Drawing Sheets

INTERCONNECTION AND AIRCRAFT OR SPACECRAFT HAVING SUCH AN INTERCONNECTION

CROSS-REFERENCE TO RELATED APPLICATIONS

This application is a continuation of PCT International Application No. PCT/EP2009/051193 filed Feb. 3, 2009, which claims the benefit of German Patent Application No. 10 2008 012 252.1, filed Mar. 3, 2008, and U.S. Provisional Application No. 61/067,922, filed Mar. 3, 2008, the entire disclosures of which are herein incorporated by reference.

FIELD OF THE INVENTION

The present invention relates to an interconnection, in particular in the aerospace sector, and to an aircraft or spacecraft with an interconnection of this type.

Nowadays, T-stringers and Ω-stringers are indispensable in the production of shells for aircraft construction. On account of the static load requirements and an attempt to build the structures such that they are as light and as easy to service as possible, it is necessary in some regions to attach T-stringers and Ω-stringers together. At present, there are no suitable solutions for this.

SUMMARY OF THE INVENTION

Therefore, the object of the present invention is to create an interconnection which provides a coupling between an Ω-stringer and a T-stringer and which is relatively insensitive to tolerances in respect of the orientation of the Ω-stringer relative to the T-stringer.

Accordingly, an interconnection, in particular in the aerospace sector, is provided which comprises a T-stringer, an Ω-stringer and a connection arrangement. The T-stringer has a web portion and two foot portions which are connected at an angle at one end of the web portion and are aligned approximately opposite one another. The Ω-stringer has a comb portion and two foot portions which are connected at opposing ends of the comb portion and are substantially aligned opposite one another. The connection arrangement joins the foot portions of the T-stringer and of the Ω-stringer.

Furthermore, an aircraft or spacecraft with the interconnection according to the invention is provided.

The idea on which the present invention is based is for only the foot portions of the T-stringer and the Ω-stringer to be coupled together. This is considerably easier than, for example coupling together the web portion of the T-stringer and the comb portion of the Ω-stringer. Coupling the web portion of the T-stringer with the comb portion of the Ω-stringer would necessitate the adaptation of the connection arrangement to the relatively complex geometric shape of the comb portion of the Ω-stringer.

Furthermore, according to the invention, an exact fit between the connection arrangement and the foot portions of the T-stringer and of the Ω-stringer is unnecessary; in other words, the connection arrangement can be positioned flexibly in respect of the T-stringer and the Ω-stringer and can then be connected thereto, for example bonded and/or riveted and thus can ensure a tolerance compensation between the T-stringer and the Ω-stringer. This is advantageous particularly during the assembly of fuselage sections, where a first fuselage section has a first skin portion with the T-stringer and a second fuselage section has a second skin portion with the Ω-stringer, with the connection arrangement connecting the T-stringer to the Ω-stringer.

The subclaims provide advantageous developments of the invention.

An A-stringer is also to be preferably subsumed under the term "Ω-stringer".

According to a preferred development of the interconnection according to the invention, the connection arrangement connects the T-stringer and the Ω-stringer in the longitudinal direction of said stringers. This produces a favourable force flux in the interconnection.

According to a further preferred development of the interconnection according to the invention, the connection arrangement has a foot portion which joins together the foot portions of the T-stringer and of the Ω-stringer, and has a web portion which is aligned substantially vertically to the foot portion. Thus, the connection arrangement also makes a significant contribution to the rigidity of the interconnection.

According to a further preferred development of the interconnection according to the invention, on one end or on both its ends, the web of the connection arrangement has bevels which taper off towards the foot portions of the T-stringer and of the Ω-stringer. Thus, there is no substantial change in rigidity or only a gradual change in rigidity in the region of the connection arrangement; in other words, a jump in rigidity is avoided. The bevels are preferably arranged such that a force flux which passes, for example from the Ω-stringer through the connection arrangement and in turn into the T-stringer, "sees" a completely constant rigidity. The term "rigidity" as used herein preferably means the rigidity about an axis which is located in a plane parallel to the foot portions and is positioned substantially vertically on the web portion of the T-stringer or the comb portion of the Ω-stringer. This results in favourable deformation behaviour, favourable strength characteristics and favourable fatigue characteristics of the interconnection.

According to a further preferred development of the interconnection according to the invention, the bevel forms with the foot portion an angle of from 15 to 45°. Such an angle is advantageous for a gradual transition in rigidity from the T-stringer or the Ω-stringer to the connection arrangement.

According to a further preferred development of the interconnection according to the invention, the foot portion of the connection arrangement has a first cut which tapers off towards the web portion of the T-stringer, and/or a second out which is directed away from the web portion of the 7-stringer. These cuts preferably run at an angle of from 15 to 45° with respect to the longitudinal direction of the T-stringer. The advantages of this development are the same as those which have already been described in connection with the bevels of the web portion of the connection arrangement.

According to a further preferred development of the interconnection according to the invention, the connection arrangement has a first connection element and a second connection element, the first connection element connecting a first foot portion of the T-stringer to a first foot portion of the Ω-stringer and the second connection element connecting a second foot portion of the T-stringer to a second foot portion of the Ω-stringer. The use of two separate connection elements provides the advantage that it is possible to react more flexibly to tolerance fluctuations between the Ω-stringer and the T-stringer in respect of their orientation to one another.

According to a further preferred development of the interconnection according to the invention, the first and/or second connection element has at least in portions a U-shaped and/or a T-shaped cross section. The limbs of the U correspond to two web portions of the connection arrangement, while the base of the U corresponds to the foot portion of the connection arrangement. The longitudinal bar of the T corresponds to the web portion of the connection arrangement, while the cross-bar of the T corresponds to the foot portion of the connection arrangement. Connection elements of this type are simple to produce and have a high rigidity.

According to a further preferred development of the interconnection according to the invention, the first and second connection elements form a first receiving region in which they receive between them the comb portion of the Ω-stringer, and/or a second receiving region in which they receive between them the web portion of the T-stringer. In this respect, the web portions of the first and second connection elements preferably overlap with the comb portion and the web portion of the T-stringer. The result of this is overall a very rigid interconnection.

According to a further preferred development of the interconnection according to the invention, the first receiving portion has a first web portion and the second receiving portion has a second web portion, the first and second web portions overlapping in portions. In the transverse direction (i.e. transversely to the longitudinal direction of the T-stringer and the Ω-stringer), the comb portion of the Ω-stringer is configured to be significantly wider than the web portion of the T-stringer. This requires the first web portion, if it is of a straight configuration, to be located further out, based on the longitudinal direction, than the second web portion of the second receiving portion. To then allow a direct rigidity transition between the first and second web portions, if they are not joined together, they are arranged with respect to one another such that portions of them overlap one another.

According to a further preferred development of the interconnection according to the invention, the first and second connection elements together have a substantially H-shaped outline. In this respect, the two open ends of the H form the first and second receiving regions for the web portion of the T-stringer and the comb portion of the Ω-stringer, respectively.

According to a further preferred development of the interconnection according to the invention, the T-stringer is connected to a first skin portion and the Ω-stringer is connected to a second skin portion, the connection arrangement bridging the first and second skin portions and the first and second connection elements each have in a bridging region a foot portion which widens one towards the other and each of which is connected to a band bridging the first and second skin portions. Two skin portions can thus be connected together in a very stable manner.

According to a further preferred development of the interconnection according to the invention, an angle bracket, in particular for connecting a former to the Ω-stringer and the T-stringer, is connected to the widening foot portions of the first and second connection elements. This produces an even more stable interconnection. The angle bracket is preferably riveted and/or bonded to the foot portions. The rivets then preferably extend through the first and second skin portions, through the band and through one of the foot portions.

According to a further preferred development of the aircraft or spacecraft, the first skin portion is configured as a first fuselage section and the second skin portion is configured as a second fuselage section. In this manner, fuselage sections can be joined together, it being possible for an Ω-stringer of the first fuselage section to be connected to a T-stringer of the second fuselage section, without having to observe particularly narrow tolerances during production.

The Ω-stringer, the T-stringer, the connection arrangement, the first skin portion and/or the second skin portion are preferably formed from fibre composite material or an aluminium alloy. Included as fibre composite materials are in particular CFRP (carbon fibre reinforced plastic), GRFP (glass fibre reinforced plastic) and/or Glare®, in each case optionally with additional fibres of other materials, for example aramid.

The interconnection according to the invention is particularly suitable for T-stringers and Ω-stringers, skin portions and/or fuselage sections of fibre composite material since they can be produced in a less precise manner than those of an aluminium alloy and therefore a tolerance compensation between the Ω-stringer and the T-stringer is more likely to be required.

BRIEF DESCRIPTION OF THE DRAWINGS

In the following, the invention will be described in detail on the basis of embodiments with reference to the accompanying figures.

DESCRIPTION OF EXEMPLARY EMBODIMENTS

Figure 1:
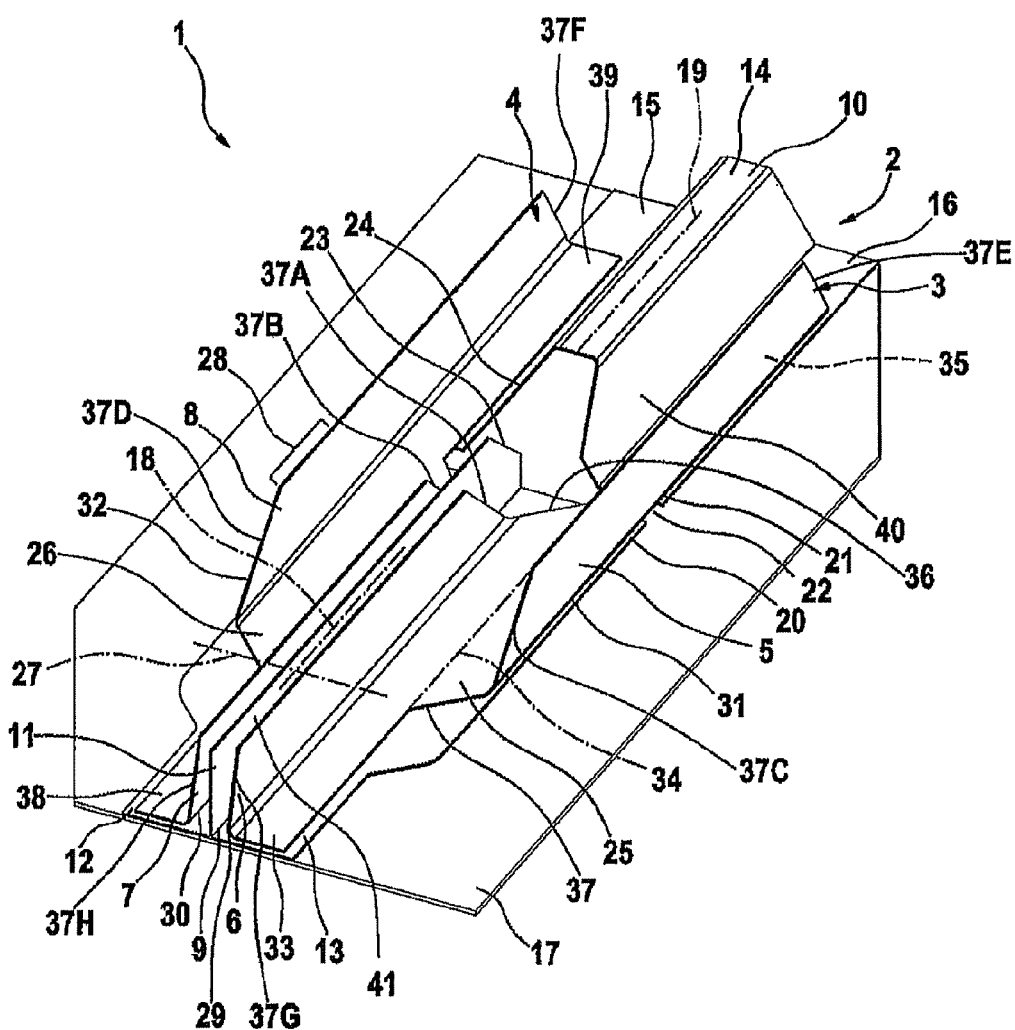
FIG. 1 is a perspective view of an interconnection according to an embodiment of the present invention, an Ω-stringer being directly coupled with a T-stringer.

In the figures, the same or functionally identical components are provided with the same reference numerals, unless indicated otherwise.

An interconnection 1 with a connection arrangement 2, the connection elements 3 and 4 of which are configured with in each case two web portions 5, 6 and 7, 8, respectively, will be described in detail in conjunction with FIG. 1 to 3.

FIG. 1 is a perspective view of the interconnection 1 according to a preferred embodiment of the invention, a T-stringer 9 being directly coupled with an Ω-stringer 10 by the connection arrangement 2.

The T-stringer 9 has a web portion 11 and foot portions 12, 13 which are connected at an angle to one end of the web portion 11 and are aligned substantially opposite one another. The Ω-stringer 10 has a comb portion 14 and two foot portions 15, 16 which are connected at opposing ends of the comb portion 14 and are substantially aligned opposite one another. The T-stringer 9 and the Ω-stringer 10 are connected to a skin portion 17 at their foot portions 12, 13 and 15, 16, respectively. This can be achieved, for example by riveting or adhesive bonding.

The connection arrangement 2 connects the T-stringer 9 and the Ω-stringer 10 along their respective longitudinal directions 18 and 19, i.e. the longitudinal directions 18, 19 are aligned substantially in tandem and coaxially to one another (in the present case, the longitudinal directions 18 and 19 correspond to the axes of symmetry of the T-stringer 9 and the Ω-stringer 10, respectively, in an upper view thereof).

An end 20 of the T-stringer 9 and an end 21 of the Ω-stringer 10 form a gap 22 between them. In the embodiment according to FIG. 1, the width of the gap 22 amounts to only a few millimetres. In the region of the ends 20 and 21, the foot portions 12, 13 of the T-stringer 9 and the foot portions 15, 16 of the Ω-stringer 10 are each configured such that they widen in each case transversely to the longitudinal direction 18, 19. The web portion 11 of the T-stringer 9 and the comb portion 14 of the Ω-stringer 10 are each configured with a bevel 23 and 24, respectively, in the region of the ends 20 and 21, respectively. The bevels 23 and 24 taper off in each case towards the end 20 of the T-stringer 9 and the end 21 of the Ω-stringer 10, respectively.

Each of the connection elements 3 and 4 has a foot portion 25 and 26, respectively, to which the web portions 5, 6 and 7, 8 are connected at an angle. In this respect, the angle is preferably 90°, but can also be between 45 and 90°, for example.

The web portions 5 and 6 of the connection element 3 as well as the web portions 7 and 8 of the connection element 4 are arranged offset relative to one another in the transverse direction 27 (i.e. transversely to the longitudinal direction 18 of the T-stringer 9 and to the longitudinal direction 19 of the Ω-stringer 10). The web portions 5, 6 and 7, 8 preferably overlap viewed along the transverse direction 27, over a portion 28. A cross section in the region of the overlap portion 28 through the connection element 3 or 4 has the shape of a U, the limbs of the U being formed by the web portions 5, 6 and 7, 8 and the base of the U being formed by the foot portion 25 and 26. The web portions 5 to 8 preferably extend substantially parallel to one another. The web portions 6, 7 of the connection elements 3, 4 are formed integrally in each case with the edge 29, 30, facing the web portion 11 of the T-stringer 9, of the foot portion 25 and 26, while the web portions 5, 8 of the connection elements 3, 4 are formed integrally with the edge 31, 32, remote from the web portion 11 of the stringer 9.

Each of the foot portions 25, 26 is composed of a first portion 33 and a second portion 35 (described by way of example for the foot portion 25). The portions 33 and 35 have a substantially rectangular cross section and extend substantially offset relative to one another in the transverse direction 27 and parallel to one another in the longitudinal direction 18, 19. The portion 33 is connected to portion 35 along an imaginary boundary line 34 shown in dashed lines. The portions 33 and 35 are each provided at their ends by which they adjoin one another with a straight or curved out 36 and 37, respectively, which preferably extends at an angle of approximately 45° to the transverse direction 27. Portions 38, 39 of connection element 4 correspond to portions 33 and 35 of connection element 3.

The portions 35 and 39 of connection elements 3 and 4, respectively, preferably form a receiving region 40 between them in which the comb portion 14 of the Ω-stringer 10 is arranged. The portions 35 and 39 are connected in a first region, in which they overlap the foot portions 15 and 16 of the Ω-stringer 10, to said foot portions 15 and 16 and are connected in a second region, in which they overlap the foot portions 12, 13 of the T-stringer 9, to said foot portions 12, 13, for example by adhesive or rivets. The portions 33 and 38 of connection elements 3 and 4, respectively, form a receiving region 41 between them in which the web 11 of the T-stringer 9 is arranged. The portions 33 and 38 of connection elements 3 and 4 are each preferably positioned with their full surface on the foot portions 12 and 13 of the T-stringer 9 and are connected thereto, for example by adhesive and/or rivets.

The web portions 6 and 7 of connection elements 3 and 4 have bevels 37A and 37B which taper off towards the Ω-stringer 10 at an angle of approximately 15 to 45°. The web portions 5 and 8 of connection element 3 and 4, respectively, also have bevels 37C, 37D which taper off in a direction away from the Ω-stringer 10 at an angle of approximately 15 to 45°. Furthermore, the web portions 5 and 8 are preferably provided with bevels 37E and 37F which taper off in a direction away from the T-stringer 9. The web portions 6 and 7 of connection element 3 and 4, respectively, are preferably also provided with bevels 37G and 37H which taper off in a direction away from the Ω-stringer 10.

Figure 2:
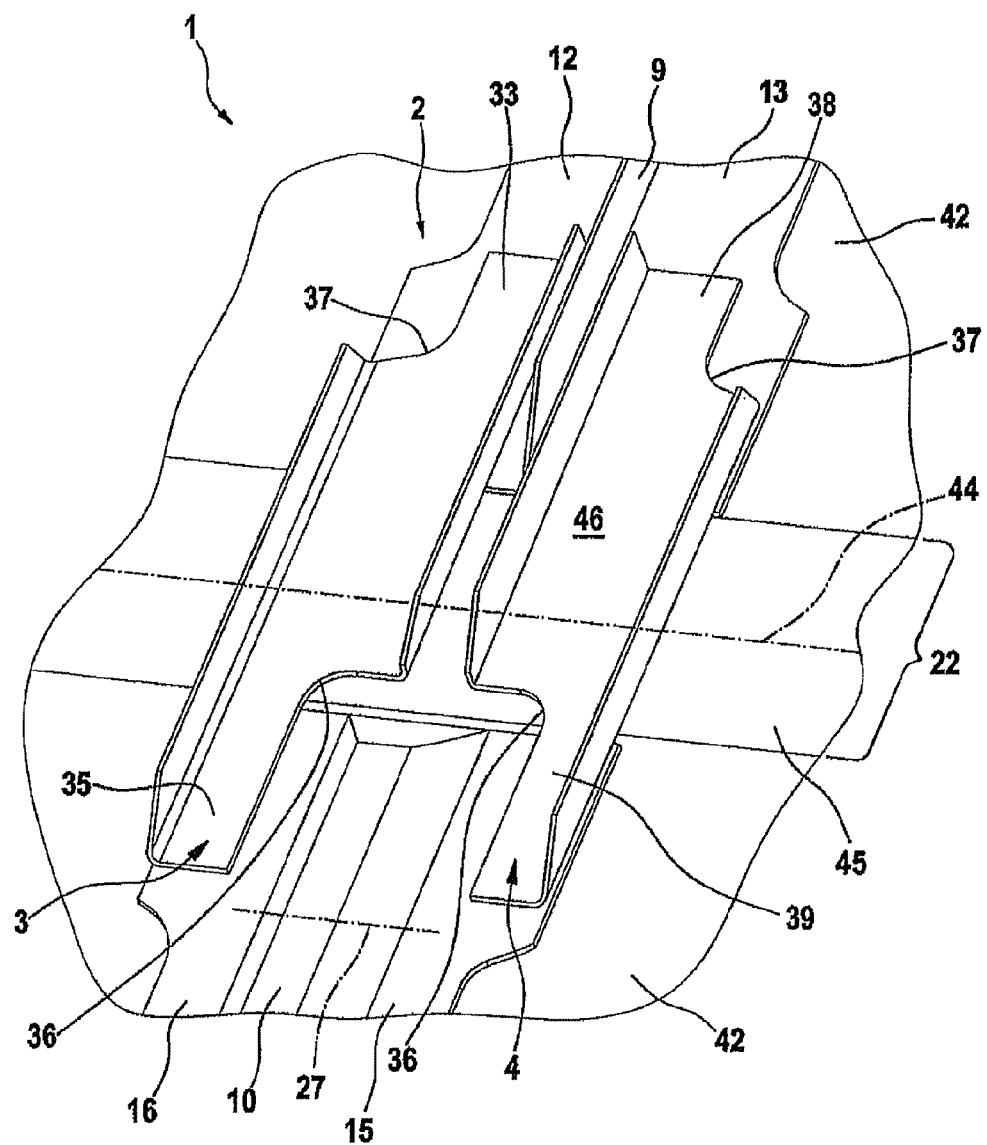
FIG. 2 is a perspective view of an interconnection according to a further embodiment of the present invention, an Ω-stringer being coupled with a T-stringer via a transverse joint.

FIG. 2 is a perspective view of an interconnection according to a further embodiment of the invention. In the following, only the differences compared to the embodiment of FIG. 1 will be described.

In the embodiment according to FIG. 2, the T-stringer 9 with its foot portions 12, 13 is fitted to a skin portion 42 and the Ω-stringer 10 with its foot portions 15, 16 is fitted to a skin portion 43, in particular by rivets or adhesive. The skin portions 42 and 43 are, for example components of a first and second fuselage barrel which, however, is not shown.

The skin portions 42, 43 form a joint identified by a dashed line 44. In the transverse direction 27, a band 45 which covers the joint 44 runs on the skin portions 42, 43, i.e. the band 45 bridges the joint 44. If the skin portions 42, 43 are components of two fuselage barrels, the band 45 preferably runs in the peripheral direction of the fuselage barrels.

In the embodiment according to FIG. 2, the gap 22 is configured to be of a width, typically several centimeters, such that the band 45 can be passed through between the T-stringer 9 and the Ω-stringer 10. The portions 33 and/or 35 are then positioned in portions on the band 45 in a region 46 in which they are connected, for example bonded or riveted, to the band 45 and the skin portions 42, 43. The same applies accordingly to the connection element 4.

The cuts 36 and 37 are configured to be rounded in the embodiment according to FIG. 2.

Figure 3:
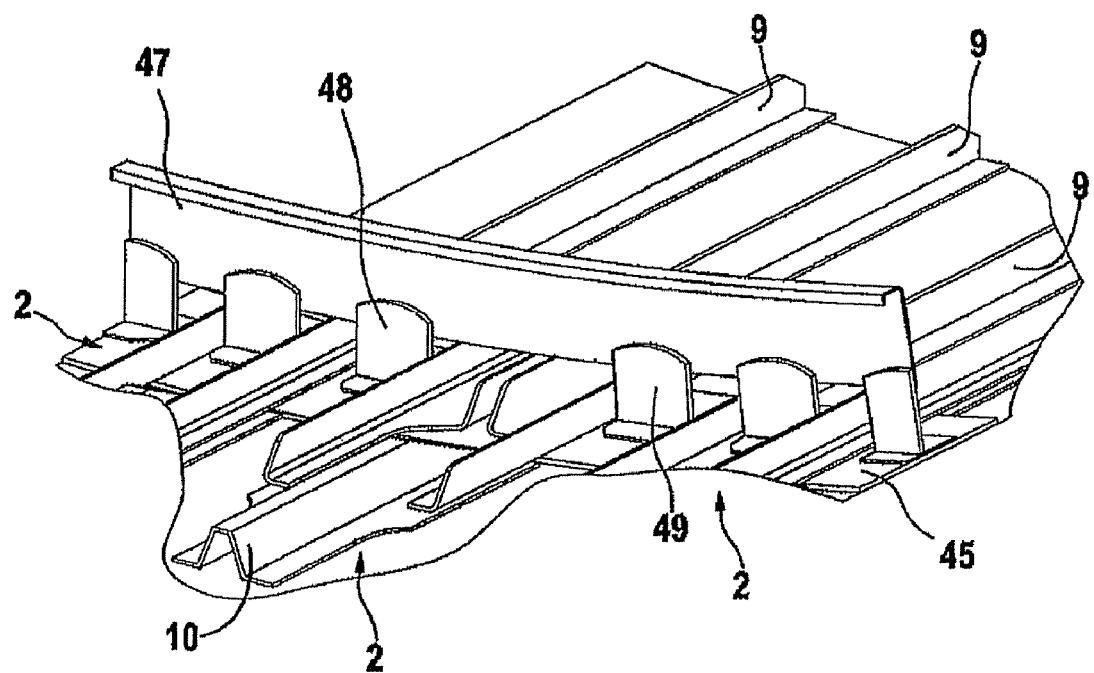
FIG. 3 is a perspective view of the interconnection from FIG. 2 with a former and angle brackets.

In contrast to the embodiment according to FIG. 2, in the embodiment according to FIG. 3, furthermore a former 47 is provided which is coupled with the band 45 by angle brackets (for example denoted by reference numerals 48 and 49).

Figure 4:
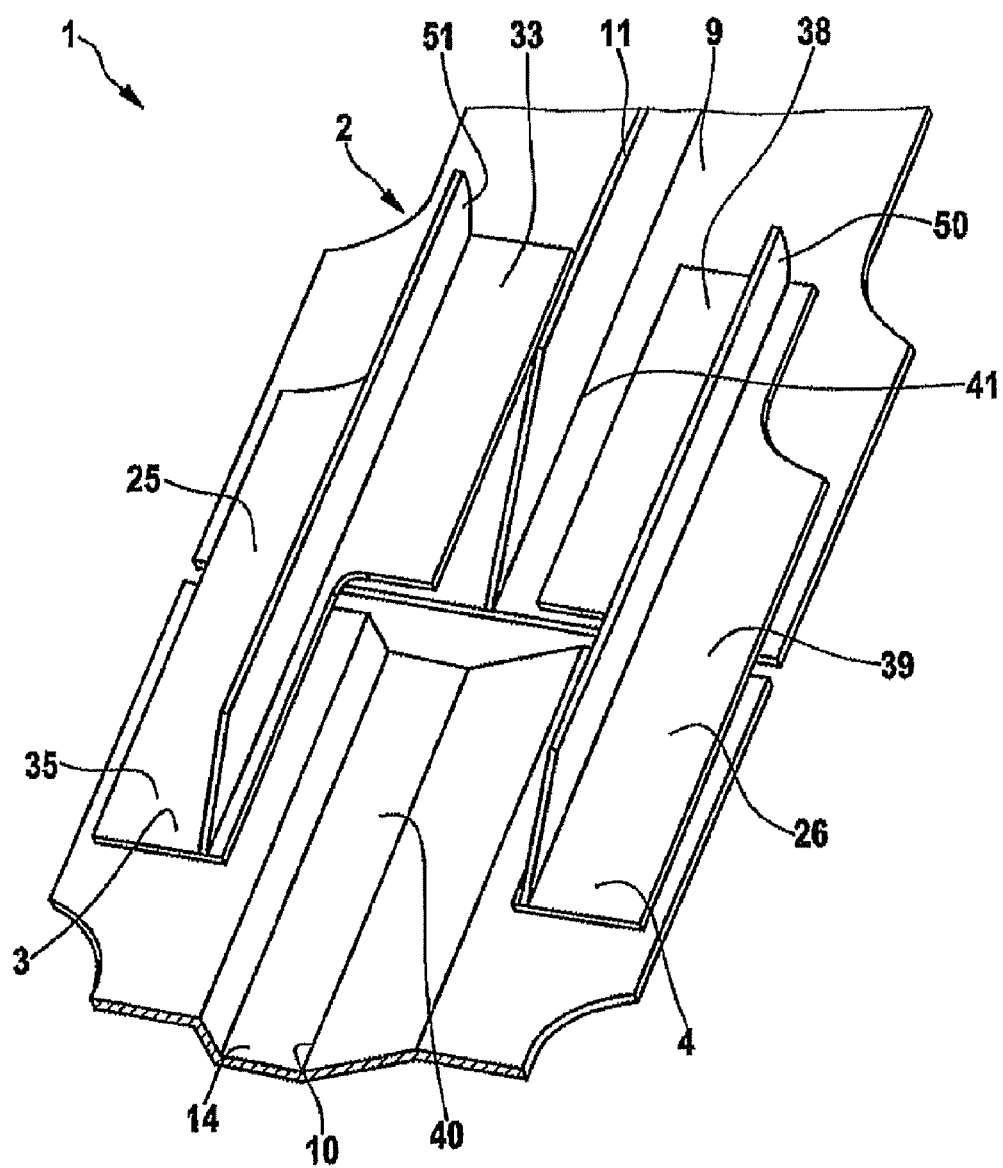
FIG. 4 is a perspective view of an interconnection according to a further embodiment of the present invention, an Ω-stringer being directly coupled with a T-stringer.

FIG. 4 is a perspective view of an interconnection 1 according to a further embodiment of the present invention.

The connection arrangement 2 according to the embodiments of FIG. 4 to 6 differs from the embodiments of FIG. 1 to 3 as follows:

As illustrated in FIG. 4, the connection elements 3 and 4 each have only one web portion 50 and 51, respectively, instead of the two web portions 5, 6 and 7, 8, as in the embodiment according to FIG. 1. The web 50 extends along the edge of the portion 39 which faces the comb portion 14 and extends substantially along the edge of portion 38 remote from the web 11 of the T-stringer 9. The web 51 of connection element 3 is configured in a corresponding manner.

Figure 5:
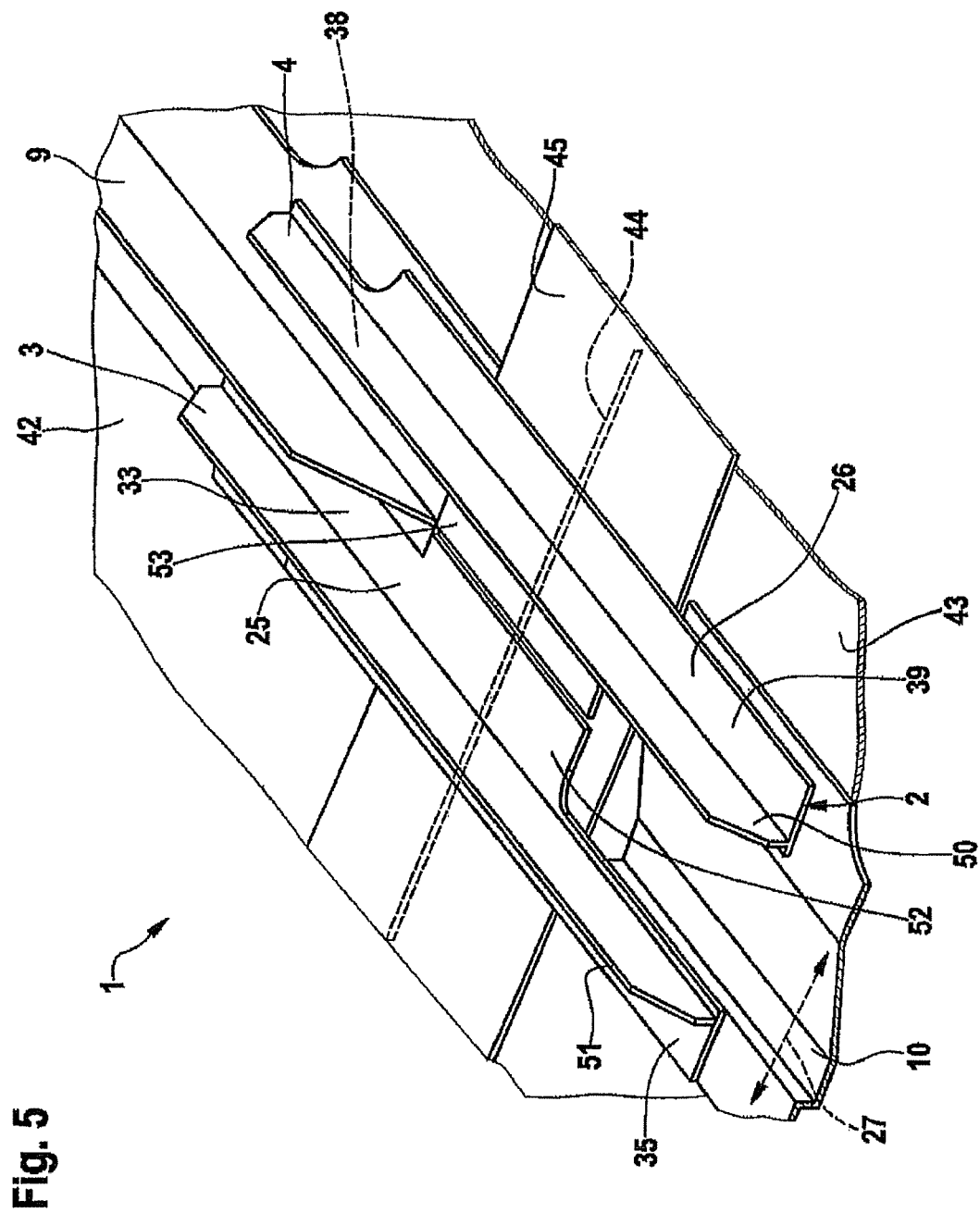
FIG. 5 is a perspective view of an interconnection according to a further embodiment of the present invention, an Ω-stringer being coupled with a T-stringer via a transverse joint.

FIG. 5 is a perspective view of a further embodiment of the interconnection 1 according to the invention.

The connection arrangement 2 connects two skin portions 42, 43 by a joint 44, said joint 44 being covered by a band 45, as already described in conjunction with the embodiment according to FIG. 2. The characteristic of the embodiment according to FIG. 5 is that the portions 33 and 38 of the foot portions 25 and 26, respectively, widen towards each other in the region of the band 45 in direction 27. These widened portions are denoted by reference numerals 52 and 53 in FIG.

5. The widened portions 52 and 53 are preferably each connected to the band 45 by rivets and/or adhesive. In a plan view, i.e. vertically to the skin portions 42, 43, the connection arrangement 2 has a substantially H-shaped outline. A cross section through the connection element 3 or 4 in the region of the widened portion 52, 53 is preferably substantially T-shaped. A configuration of the connection elements 3 and 4 as an integral component is also possible, in which case in particular the widened portions 52 and 53 are interconnected.

Figure 6:
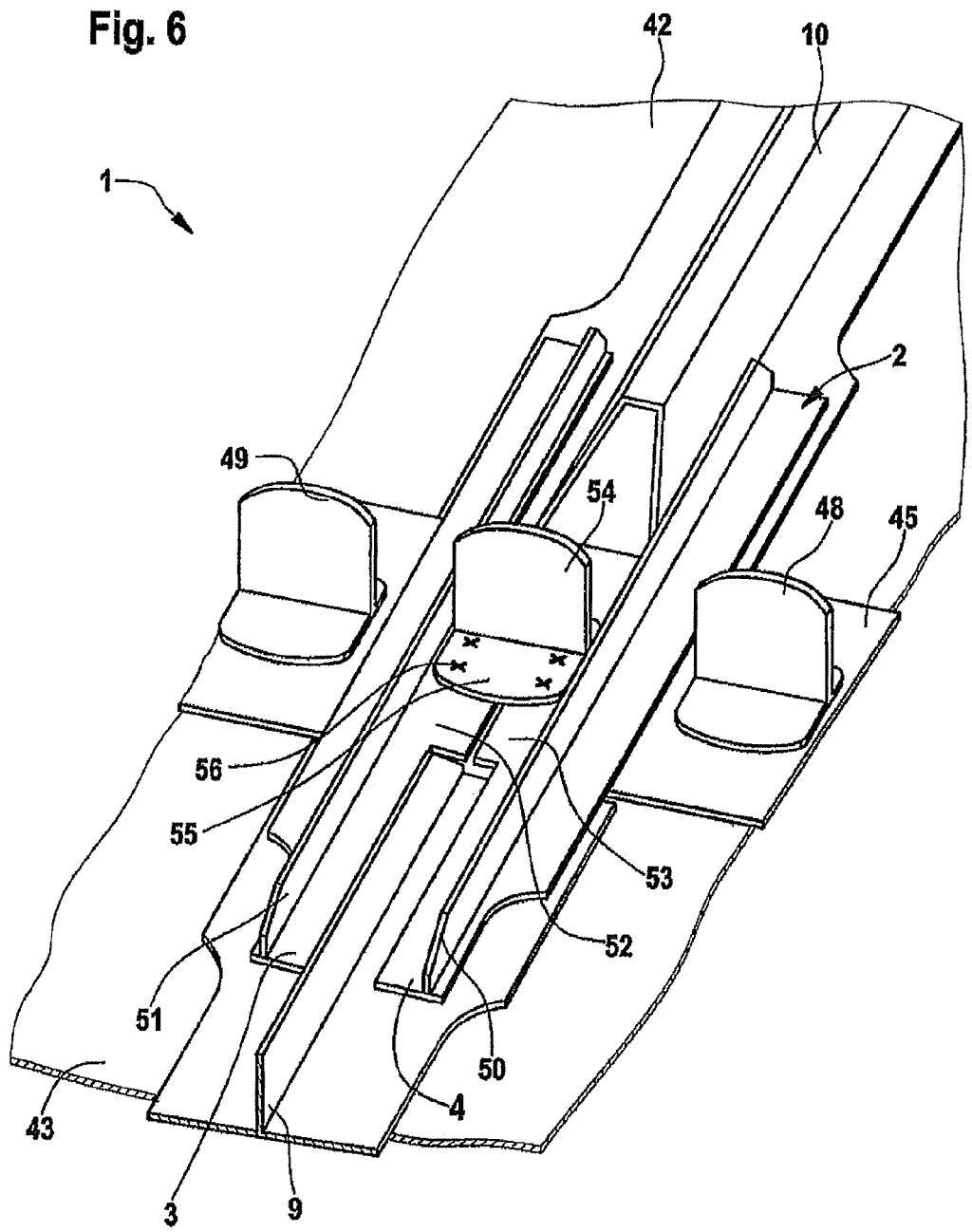
FIG. 6 is a perspective view of the interconnection from FIG. 5, with the provision of angle brackets.

FIG. 6 shows the embodiment of FIG. 5 in which angle brackets 48, 49 and 54 are provided. The characteristic here is that angle bracket 54 is arranged between the web portions 50 and 51 of the connection element 4, 3 such that it sits with its foot portion 55 on the widened portions 52 and 53. The foot portion 55 of the angle bracket 54 is preferably connected to the widened portions 52 and 53 of the connection elements 4, 3 by rivets and/or adhesive. A rivet (provided by way of example with reference numeral 56) extends through the foot portion 55 of the angle bracket 54, then through the widened portion 52 of the connection element 3, then through the band 45 and thereafter through the skin portion 43.

The angle brackets 48, 49 and 54 are each connected to a former (not shown) which corresponds to the former 47 of FIG. 3.

According to the present embodiments, the entire interconnection 1 is produced from fibre composite material. However, it is of course also possible for some of the components, for example the skin portions 42 and 43, the connection elements 3, 4 or the T-stringer 9 or Ω-stringer 10 to be produced from metal.

Although the present invention has been described here on the basis of preferred embodiments, it is not restricted thereto, but can be modified in many different ways.

The present invention provides an interconnection, in particular for the aerospace sector. The interconnection has a T-stringer, an Ω-stringer and a connection arrangement. The connection arrangement only joins together foot portions of the T-stringer and of the Ω-stringer. Thus, a coupling of an Ω-stringer with a T-stringer is provided which is relatively insensitive to tolerances in respect of the orientation of the Ω-stringer relative to the T-stringer.

| | |
|---|---|
| 1 | interconnection |
| 2 | connection arrangement |
| 3 | connection element |
| 4 | connection element |
| 5 | web portion |
| 6 | web portion |
| 7 | web portion |
| 8 | web portion |
| 9 | T-stringer |
| 10 | Ω-stringer |
| 11 | web portion |
| 12 | foot portion |
| 13 | foot portion |
| 14 | comb portion |
| 15 | foot portion |
| 16 | foot portion |
| 17 | skin portion |
| 18 | longitudinal direction |
| 19 | longitudinal direction |
| 20 | end |
| 21 | end |
| 22 | gap |
| 23 | bevel |
| 24 | bevel |
| 25 | foot portion |
| 26 | foot portion |
| 27 | transverse direction |

-continued

| | |
|---|---|
| 28 | overlap portion |
| 29 | edge |
| 30 | edge |
| 31 | edge |
| 32 | edge |
| 33 | portion |
| 34 | line |
| 35 | portion |
| 36 | cut |
| 37A | bevel |
| 37B | bevel |
| 37C | bevel |
| 37D | bevel |
| 37E | bevel |
| 37F | bevel |
| 37G | bevel |
| 37H | bevel |
| 38 | portion |
| 39 | portion |
| 40 | receiving region |
| 41 | receiving region |
| 42 | skin portion |
| 43 | skin portion |
| 44 | joint |
| 45 | band |
| 46 | region |
| 47 | band |
| 48 | angle bracket |
| 49 | angle bracket |
| 50 | web portion |
| 51 | web portion |
| 52 | widened portion |
| 53 | widened portion |
| 54 | angle bracket |
| 55 | foot portion |

The invention claimed is:

1. An interconnection, in particular in the aerospace sector, comprising:
 a T-stringer which has a web portion and two foot portions which are connected at an angle at one end of the web portion and are aligned approximately opposite one another;
 an Ω-stringer which has a comb portion and two foot portions which are connected at opposing ends of the comb portion and are aligned substantially opposite one another; and
 a connection arrangement which joins together the foot portions of the T-stringer and of the Ω-stringer, wherein the connection arrangement joins together the T-stringer and the Ω-stringer in their longitudinal directions and has a foot portion which joins together the foot portions of the T-stringer and of the Ω-stringer and has a web portion which is aligned substantially vertically to the foot portion, the web portion of the connection arrangement having on one end or on both ends bevels which taper off towards the foot portions of the T-stringer and of the Ω-stringer and the bevel forms an angle of approximately 15 to 45° with the foot portion, the foot portion of the connection arrangement having a first cut which tapers off towards the web portion of the T-stringer and having a second cut which is directed away from the web portion of the T-stringer;
 wherein the connection arrangement has a first connection element and a second connection element, the first connection element connecting a first foot portion of the T-stringer to a first foot portion of the Ω-stringer and the second connection element connecting a second foot portion of the T-stringer to a second foot portion of the Ω-stringer;

wherein the first and second connection elements together have a substantially H-shaped outline; and wherein at least one angle bracket, in particular for connecting a former to the Ω-stringer and the T-stringer, is connected to widening foot portions of the first and second connection elements.

2. The interconnection according to claim 1, wherein the first and/or second connection element has/have a U-shaped and/or a T-shaped cross section at least in portions.

3. The interconnection according to claim 1, wherein the first and second connection element form a first receiving region in which they receive the comb portion of the Ω-stringer between them, and/or form a second receiving region in which they receive the web portion of the T-stringer between them.

4. The interconnection according to claim 3, wherein the first receiving region has a first web portion and the second receiving portion has a second web portion, the first and second web portions overlapping at least in portions.

5. The interconnection according to claim 1, wherein the T-stringer is connected to a first skin portion and the Ω-stringer is connected to a second skin portion, the connection arrangement bridging the first and second skin portions and the first and second connection elements each have in a bridging region a foot portion which widens one towards the other and which are each connected to a band bridging the first and second skin portions.

6. An aircraft or spacecraft, comprising at least one interconnection according to claim 1.

7. The aircraft or spacecraft according to claim 6, wherein the first skin portion is configured as a first fuselage section and/or the second skin portion is configured as second fuselage section.

* * * * *